United States Patent
Ham

(10) Patent No.: US 11,236,838 B2
(45) Date of Patent: Feb. 1, 2022

(54) TEMPERATURE PRESSURE RELIEF DEVICE

(71) Applicants: HYUNDAI MOTOR COMPANY, Seoul (KR); KIA MOTORS CORPORATION, Seoul (KR)

(72) Inventor: Jeong Hyun Ham, Jeonju-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/931,128

(22) Filed: May 13, 2020

(65) Prior Publication Data

US 2021/0180708 A1    Jun. 17, 2021

(30) Foreign Application Priority Data

Dec. 16, 2019    (KR) .......................... 10-2019-0168266

(51) Int. Cl.

| F16K 17/00 | (2006.01) |
| F16K 31/00 | (2006.01) |
| F17C 13/04 | (2006.01) |
| H01M 8/04082 | (2016.01) |

(52) U.S. Cl.
CPC .......... *F16K 17/003* (2013.01); *F16K 31/002* (2013.01); *F17C 13/04* (2013.01); *F17C 2270/0763* (2013.01); *H01M 8/04201* (2013.01); *H01M 2250/20* (2013.01)

(58) Field of Classification Search
CPC .......... H01M 8/04201; H01M 2250/20; F17C 2270/0763; F17C 13/04; F16K 17/003; F16K 31/002; Y10T 137/7724; Y10T 137/7737; Y10T 137/1797; Y10T 137/1819; Y10T 137/1812
See application file for complete search history.

(56) References Cited

U.S. PATENT DOCUMENTS

| 1,670,764 | A | * | 5/1928 | Donnelly | ............... | F16K 17/003 |
| | | | | | | 137/73 |
| 4,744,383 | A | * | 5/1988 | Visnic | ................... | F16K 17/383 |
| | | | | | | 137/72 |
| 5,495,865 | A | * | 3/1996 | Wass | ..................... | F16K 17/383 |
| | | | | | | 137/68.22 |
| 5,511,576 | A | * | 4/1996 | Borland | ................ | F16K 17/383 |
| | | | | | | 137/72 |

(Continued)

*Primary Examiner* — Jessica Cahill
(74) *Attorney, Agent, or Firm* — Morgan, Lewis & Bockius LLP

(57) ABSTRACT

A temperature pressure relief device includes a body including an inlet passage into which high-pressure gas is introduced, an interior passage extending from the inlet passage in a predetermined first direction, and a high-pressure gas exhaust passage that is formed between the inlet passage and a reference end that is a distal end of the interior passage in the first direction and that connects the interior passage to an outside, a blocking part disposed in the interior passage of the body and selectively placed in one of a blocking state or a connecting state, and a support part arranged between the blocking part and the reference end, in which the support part is maintained in a solid state at a reference temperature or less and is in a molten state at more than the reference temperature and discharged from the interior passage.

11 Claims, 7 Drawing Sheets

(56) References Cited

U.S. PATENT DOCUMENTS

| | | | | |
|---|---|---|---|---|
| 5,632,297 | A * | 5/1997 | Sciullo | F16K 17/383 137/72 |
| 6,367,499 | B1 * | 4/2002 | Taku | F16K 17/383 137/72 |
| 7,150,287 | B2 * | 12/2006 | Kita | F16K 17/383 137/72 |
| 10,000,318 | B2 * | 6/2018 | Groben | F17C 13/12 |
| 2001/0018929 | A1 * | 9/2001 | Taku | F17C 13/04 137/505 |
| 2008/0276992 | A1 * | 11/2008 | Nomichi | F16K 17/383 137/79 |
| 2014/0220469 | A1 * | 8/2014 | Heise | H01M 8/04201 429/442 |
| 2020/0365917 | A1 * | 11/2020 | Ham | F17C 13/04 |

* cited by examiner

TEMPERATURE PRESSURE RELIEF DEVICE

CROSS-REFERENCE TO RELATED APPLICATION

The present application claims the benefit of priority to Korean Patent Application No. 10-2019-0168266, filed on Dec. 16, 2019 in the Korean Intellectual Property Office, the entire disclosure of which is incorporated herein by reference.

TECHNICAL FIELD

The present disclosure relates to a temperature pressure relief device.

BACKGROUND

Currently, in order to store gas, most fuel cell electric vehicles employ a method of compressing and storing high-pressure gas in a pressure vessel, and the pressure vessel is generally filled with the gas to a maximum allowable working pressure (MAWP) of 875 Bar. Due to this, safety requirements for high-pressure gas increase. In particular, due to an abnormal state such as fire, high-pressure gas stored in a gas tank may be heated, and therefore the pressure in the gas tank may be increased, which leads to damage to the tank.

To prevent this, a temperature pressure relief device for safely releasing the high-pressure gas when the temperature in the tank reaches a predetermined temperature is required. Especially, a temperature pressure relief device with high durability against external shock and vibration is required to be developed for a vehicle. The temperature pressure relief device is manufactured such that an alloy disposed therein remains in a solid state at a reference temperature or less to block high-pressure gas and is melted at less than the reference temperature to allow for release of the high-pressure gas.

In the related art, when a temperature pressure relief device of a molten alloy type operates in an abnormal situation such as fire, the surroundings may be cooled by expansion of released gas, and a molten alloy may be solidified again. Due to this, a safety accident may occur when a flow passage is narrowed or closed by the re-solidified alloy.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the prior art while advantages achieved by the prior art are maintained intact.

An aspect of the present disclosure provides a temperature pressure relief device for reducing a risk of flow-rate reduction and passage closure due to re-solidification of alloy and improving the high-pressure release stability of a vehicle or a fuel storage system that uses high-pressure gas.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a temperature pressure relief device includes a body including an inlet passage into which high-pressure gas is introduced, an interior passage extending from the inlet passage in a predetermined first direction, and a high-pressure gas exhaust passage that is formed between the inlet passage and a reference end that is a distal end of the interior passage in the first direction and that connects the interior passage to an outside of the body, a blocking part disposed in the interior passage of the body and selectively placed in one of a blocking state in which the interior passage and the high-pressure gas exhaust passage are disconnected from each other so as not to allow for a release of the high-pressure gas and a connecting state in which the interior passage and the high-pressure gas exhaust passage are connected to each other to allow for the release of the high-pressure gas, and a support part arranged between the blocking part and the reference end, in which the support part is maintained in a solid state at a reference temperature or less and is in a molten state at more than the reference temperature and discharged from the interior passage. The blocking part is placed in the blocking state by being supported by the support part when the support part is in the solid state, and the blocking part is placed in the connecting state after at least a portion of the support part is discharged from the interior passage when the support part is in the molten state.

In an exemplary embodiment, a connecting point may refer to a point on the interior passage that is located closest to the inlet passage among points at which the interior passage and the high-pressure gas exhaust passage are interconnected, and a blocking point may refer to a point on the blocking part that is located closest to the inlet passage among points at which the interior passage and the high-pressure gas exhaust passage are disconnected by the blocking part. When the support part is in the solid state, the blocking part may be supported by the support part, such that the blocking point is located closer to the inlet passage than the connecting point and that the blocking part is placed in the blocking state. When the support part is in the molten state, the blocking part may be moved in the first direction by a first reference distance or more by the high-pressure gas introduced through the inlet passage, such that the blocking point is located farther away from the inlet passage than the connecting point and that the blocking part is placed in the connecting state. The blocking state may be maintained before the blocking part is moved in the first direction by the first reference distance or more.

In an exemplary embodiment, the blocking part may include a first stem disposed in the interior passage so as to be movable between a first position where the first stem does not allow for the release of the high-pressure gas and a second position where the first stem allows for the release of the high-pressure gas and a second stem arranged between the first stem and the support part and disposed in the interior passage so as to be movable in the first direction when the support part is in the molten state. The first stem may be located in the first position by being supported by the second stem while a movement of the second stem is stopped by the support part in the solid state, and the first stem may be moved to the second position along the first direction when the support part is in the molten state and the second stem is moved in the first direction by a second reference distance or more. The blocking part may be placed in the blocking state when the first stem is located in the first position, and the blocking part may be placed in the connecting state when the first stem is located in the second position.

In an exemplary embodiment, the first stem may have an inlet connected with the inlet passage, an outlet that is open toward the second stem, and a connecting passage formed in the first stem to connect the inlet to the outlet, and the second stem may be moved in the first direction by the high-pressure gas introduced through the connecting passage and released toward the second stem when the support part is in the molten state.

In an exemplary embodiment, the inlet may have a larger area than the outlet.

In an exemplary embodiment, the first stem may be arranged such that a movement to the second position is stopped by pressure formed in a space between the first stem and the second stem when the high-pressure gas is supplied, through the connecting passage, into the space formed by a movement of the second stem.

In an exemplary embodiment, the body may further include an exhaust passage configured to be closed before the second stem is moved in the first direction by the second reference distance or more and to connect the space to the outside of the body when the second stem is moved in the first direction by the second reference distance or more.

In an exemplary embodiment, the blocking part may include a stem formed to correspond to the interior passage and a packing coupled to an outer circumferential surface of the stem so as to be brought into contact with an inner circumferential surface of the interior passage, and a ring-shaped insertion groove may be concavely formed on a surface of the stem and the packing is disposed in the insertion groove.

In an exemplary embodiment, the body may further include a support part discharge passage that connects the interior passage and the outside of the body to discharge the support part in the molten state from the interior passage.

In an exemplary embodiment, the body may further include a support that is located between the support part and the reference end and that prevents extrusion of the support part due to pressure applied to the support part by the high-pressure gas through the blocking part.

In an exemplary embodiment, the support may have a mesh structure to allow the support part in the molten state to pass through the support.

In an exemplary embodiment, the body may include a housing that has an interior space and that is open at a distal end in the first direction and a plug arranged in the interior space through an opening of the housing to cover the opening. The housing may include the inlet passage, and the plug may include the high-pressure gas exhaust passage. A diameter of the inlet passage may be smaller than an outer diameter of the blocking part such that a movement of the blocking part to the inlet passage is stopped.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
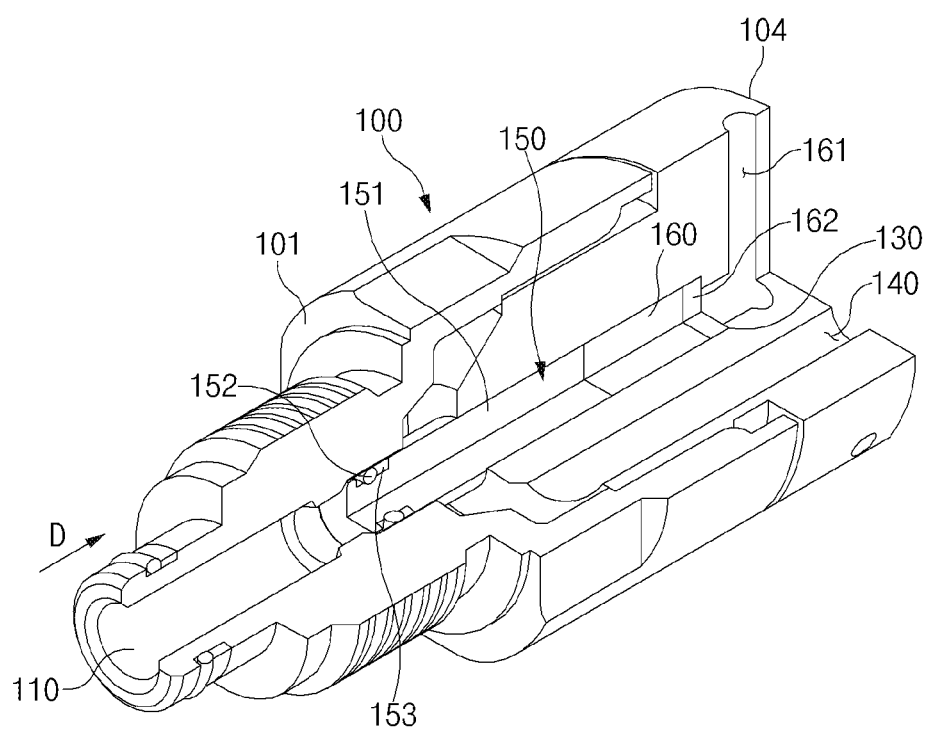
FIG. 1 is a partially cutaway perspective view illustrating a pressure relief device according to exemplary embodiment 1 of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

Exemplary Embodiment 1

Figure 2:
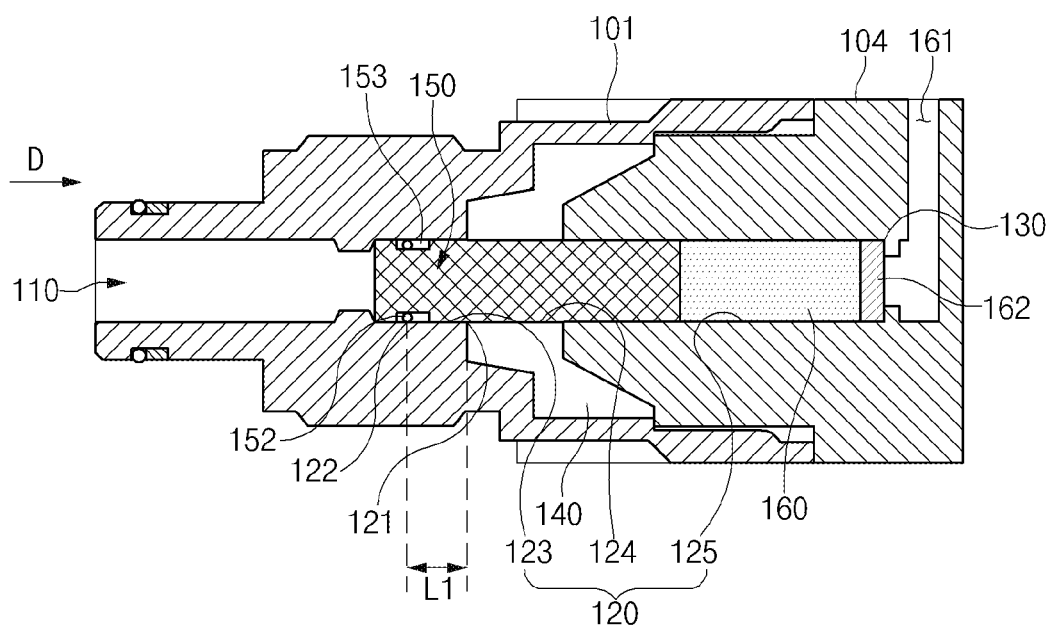
FIG. 2 is a sectional view of the pressure relief device of FIG. 1.

FIG. 1 is a partially cutaway perspective view illustrating a pressure relief device according to exemplary embodiment 1 of the present disclosure, and FIG. 2 is a sectional view of the pressure relief device of FIG. 1. The pressure relief device according to exemplary embodiment 1 of the present disclosure relates to a temperature pressure relief device. As illustrated in FIGS. 1 and 2, the pressure relief device includes a body 100, a blocking part 150, and a support part 160.

The body 100 is a body of the pressure relief device that includes an inlet passage 110, an interior passage 120 (refer to FIG. 2), and a high-pressure gas exhaust passage 140. The inlet passage 110 may be arranged such that high-pressure gas is introduced into the inlet passage 110 when the pressure relief device is installed on a pressure vessel (not illustrated) that stores the high-pressure gas. The interior passage 120 (refer to FIG. 2) may be a passage extending from the inlet passage 110 in a predetermined first direction D (toward the right with respect to FIG. 2). The high-pressure gas exhaust passage 140 may be a passage formed between the inlet passage 110 and a reference end 130, which is a distal end of the interior passage 120 in the first direction D, to connect the interior passage 120 and the outside. As illustrated in FIG. 2, the inlet passage 110 and the interior passage 120 may be located on the same axis. The number of high-pressure gas exhaust passages may be changed to regulate the flow rate of the high-pressure gas that is released.

Figure 4:
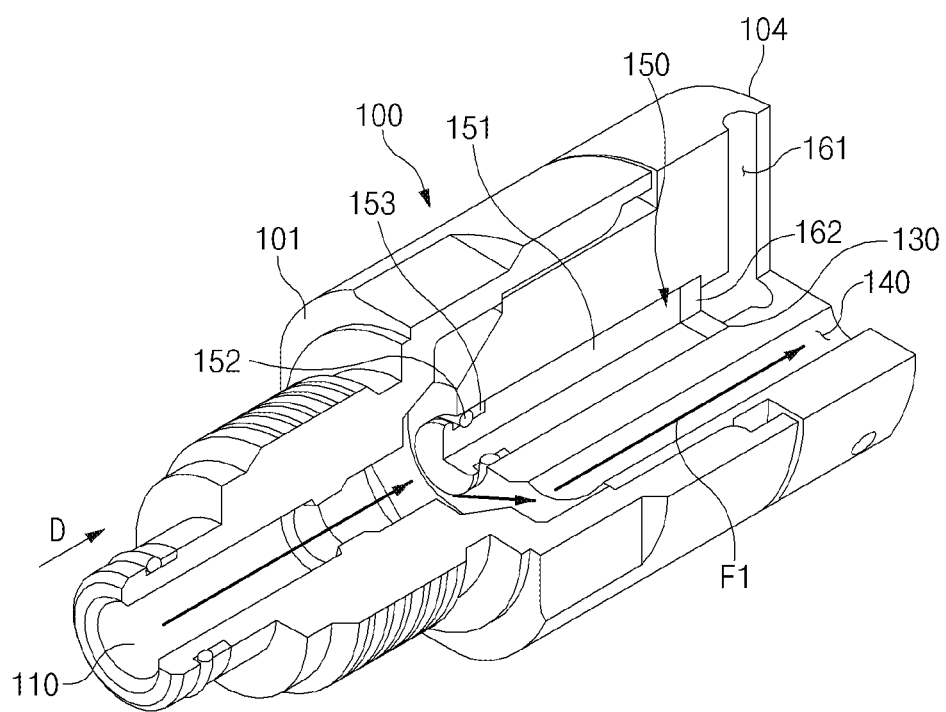
FIG. 4 is a partially cutaway perspective view illustrating a connecting state of the pressure relief device of FIG. 1.

The blocking part 150 is a component that is disposed in the interior passage 120 of the body 100 and that is selectively placed in one of a blocking state (refer to the state of FIG. 1) and a connecting state (refer to the state of FIG. 4). As illustrated in FIGS. 1 and 2, the blocking state is a state in which the interior passage 120 and the high-pressure gas exhaust passage 140 are disconnected so as not to allow release of the high-pressure gas, and as illustrated in FIG. 4, the connecting state is a state in which the interior passage 120 and the high-pressure gas exhaust passage 140 are connected so as to allow release of the high-pressure gas. FIG. 4 is a partially cutaway perspective view illustrating a connecting state of the pressure relief device of FIG. 1.

When the support part 160, which will be described below, is in a solid state, the blocking part 150, as illustrated in FIGS. 1 and 2, may be placed in the blocking state by being supported by the support part 160. Further, when the support part 160 is in a molten state, the blocking part 150, as illustrated in FIG. 4, may be placed in the connecting state after at least a portion of the support part 160 is discharged from the interior passage 120. For example, when the support part 160 is melted with a temperature rise due to, e.g., fire, the pressure applied to the blocking part 150 as the high-pressure gas is introduced through the inlet passage 110 may be transmitted to the support part 160. Due to this, the molten support part 160 may be discharged from the interior passage 120. The blocking part 150 may move to correspond to the amount of the support part 160 discharged, and therefore the blocking state of FIG. 1 may be changed to the connecting state of FIG. 4.

As illustrated in FIGS. 1 and 2, the support part 160 may be arranged between the blocking part 150 and the reference end 130. The support part 160 may remain in a solid state at a reference temperature or less and may be in a molten state at more than the reference temperature and discharged from the interior passage 120. The support part 160 may be formed of an alloy that is melted at a certain temperature at which there is a risk of damage to the pressure vessel. However, the material of the support part 160 is not limited thereto.

Hereinafter, detailed description of placing the blocking part 150 in one of the blocking state and the connecting state will be given. Hereinafter, a connecting point 121 (refer to FIG. 2), which is a point on the interior passage 120, refers to a point located closest to the inlet passage 110 among points at which the interior passage 120 and the high-pressure gas exhaust passage 140 are connected. A blocking point 122 (refer to FIG. 2), which is a point on the blocking part 150, refers to a point located closest to the inlet passage 110 among points at which the interior passage 120 and the high-pressure gas exhaust passage 140 are disconnected by the blocking part 150. In this exemplary embodiment, a packing 152 of the blocking part 150 may disconnect the interior passage 120 and the high-pressure gas exhaust passage 140, and therefore the blocking point 122 may be the point where the packing 152 of the blocking part 150 is located.

As illustrated in FIGS. 1 and 2, when the blocking part 150 is located inside the interior passage 120 such that the blocking point 122 is closer to the inlet passage 110 than the connecting point 121, the interior passage 120 and the high-pressure gas exhaust passage 140 may be disconnected from each other, and release of the high-pressure gas may not be allowed. That is, the blocking part 150 may be placed in the blocking state. The support part 160 in a solid state supports the blocking part 150, and therefore the blocking state is maintained.

As illustrated in FIG. 4, when the blocking part 150 is located inside the interior passage 120 such that the blocking point 122 is farther away from the inlet passage 110 than the connecting point 121, the interior passage 120 and the high-pressure gas exhaust passage 140 may be connected, and release of the high-pressure gas may be allowed. That is, the blocking part 150 may be placed in the connecting state. When the support part 160 is in the molten state, the blocking part 150 may be moved in the first direction D by the high-pressure gas introduced through the inlet passage 110, and the support part 160 in a molten state may be discharged from the interior passage 120. When the blocking part 150 of FIG. 1 moves more than a first reference distance L1 (refer to FIG. 2), the blocking point 122 may be located farther away from the inlet passage 110 than the connecting point 121, and the interior passage 120 and the high-pressure gas exhaust passage 140 may be connected.

The blocking state may continue to be maintained before the blocking part 150 of FIG. 1 moves the first reference distance L1 or more in the first direction D. This is because in this case, the interior passage 120 and the high-pressure gas exhaust passage 140 remain disconnected from each other by the packing 152. For example, when the support part 160 in a molten state starts to be discharged from the interior passage 120, the blocking part 150 of FIG. 1 may start to move in the first direction D, and when the blocking part 150 moves the first reference distance L1 or more due to discharge of at least a portion of the support part 160 from the interior passage 120, the high-pressure gas may start to be released. As described above, the temperature pressure relief device of this exemplary embodiment may make a time difference between the discharge of the support part 160 and the release of the high-pressure gas.

To enable the above-described operation, that is, to enable the blocking part 150 to move the first reference distance L1 or more, the distance between a distal end of the blocking part 150 in the first direction D and the reference end 130, that is, the distance by which the interior passage 120 is filled with the solid support part 160 in the first direction D may be longer than the first reference distance L1.

Because the discharge of the support part 160 and the release of the high-pressure gas are performed with a time difference in the pressure relief device of this exemplary embodiment as described above, a risk that the support part 160 is solidified again by the high-pressure gas may be reduced. Accordingly, the pressure relief device of this exemplary embodiment may reduce a risk that the high-pressure gas exhaust passage is narrowed or closed by a re-solidified support part.

Hereinafter, operation of the pressure relief device of this exemplary embodiment will be described in detail.

When the outside temperature rises due to a situation such as fire and the temperature of the support part 160 exceeds the reference temperature, the support part 160 starts to melt. When the molten support part 160 is discharged, the blocking part 150 is moved in the first direction D by the high-pressure gas introduced through the inlet passage 110. However, even though the blocking part 150 is moved in the first direction D, before the blocking point 122 of the blocking part 150 passes the connecting point 121, the interior passage 120 and the high-pressure gas exhaust passage 140 are not connected, and therefore the high-pressure gas is not released. When the blocking point 122 passes the connecting point 121 due to a continued movement of the blocking part 150, the interior passage 120 and the high-pressure gas exhaust passage 140 may be connected, and the high-pressure gas may be released.

Meanwhile, the blocking part 150 may include a stem 151 formed to correspond to the interior passage 120 and the packing 152 coupled to the outer circumferential surface of the stem 151 so as to be brought into contact with the inner circumferential surface of the interior passage 120. The stem 151 may have a ring-shaped insertion groove 153 that is concavely formed on the surface of the stem 151 and into which the packing 152 is inserted. The packing 152 may be, but is not limited to, an O-ring.

The body 100 may further include a support part discharge passage 161 that connects the interior passage 120 and the outside of the body 100. The support part discharge passage 161 may discharge the support part 160 in a molten state from the interior passage 120 to the outside of the body 100. The support part discharge passage 161 may be connected to a separate storage space defined inside the body 100. Due to this configuration, the support part 160 in a molten state may be stored in the storage space without being discharged to the outside. The support part discharge passage 161 may be formed such that the support part 160 in a solid state does not escape from the interior passage 120. For example, the diameter of the support part discharge passage 161 may be smaller than the diameter of the interior passage 120.

The body 100 may further include a support 162 located between the support part 160 and the reference end 130. The support 162 may prevent extrusion of the support part 160 due to pressure applied to the support part 160 by the high-pressure gas through the blocking part 150.

The support 162 may have a mesh structure to allow the support part 160 in a molten state to pass through the support 162. For example, the molten support part 160 may pass through the support 162 having the mesh structure and may be discharged to the support part discharge passage 161. The support part 160 may have both an effect of distributing pressure through the mesh structure and an effect of discharging the support part 160 in a molten state.

The body 100 may include a housing 101 and a plug 104. The housing 101 may have an interior space and may be open at a distal end in the first direction D. The plug 104 may be inserted into the interior space through an opening of the housing 101 and may cover the opening.

The housing 101 may include the inlet passage 110 and may have a fastening part through which the housing 101 is fastened to a tank and a valve. The plug 104 may include the high-pressure gas exhaust passage 140. For convenience of assembly, the plug 140 may be manufactured such that the plug 140 is coupled to the housing 101 after the blocking part 150 and the support part 160 are coupled to the inside of the plug 104. The diameter of the inlet passage 110 may be smaller than the outer diameter of the blocking part 150 such that a movement of the blocking part 150 to the inlet passage 110 is stopped.

Figure 3:
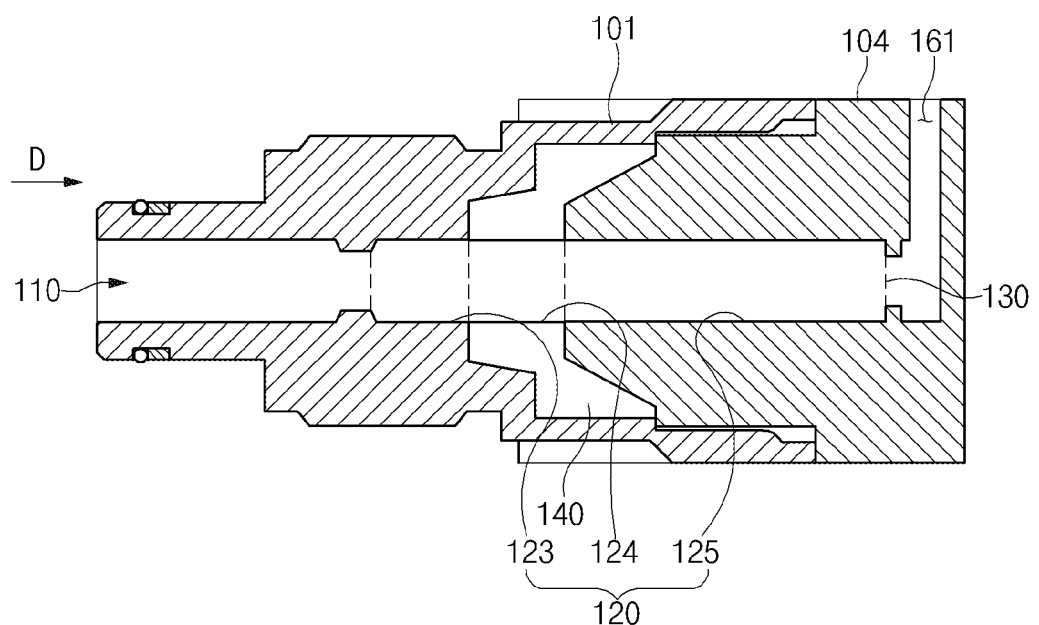
FIG. 3 is a sectional view of a body of the pressure relief device of FIG. 1.

FIG. 3 is a sectional view of the body of the pressure relief device of FIG. 1. As illustrated in FIG. 3, the interior passage 120 may include a housing interior passage 123, a plug interior passage 125, and a connecting interior passage 124. The housing interior passage 123 may be included in the housing 101. The plug interior passage 125 may be included in the plug 104. The connecting interior passage 124 may be located between the housing interior passage 123 and the plug interior passage 125 and may be connected with the high-pressure gas exhaust passage 140. In the connecting state, the high-pressure gas may start from the inlet passage 110 and may be released to the outside after sequentially passing through the housing interior passage 123, the connecting interior passage 124, and the high-pressure gas exhaust passage 140 (F1, refer to FIG. 4).

Exemplary Embodiment 2

Figure 5:
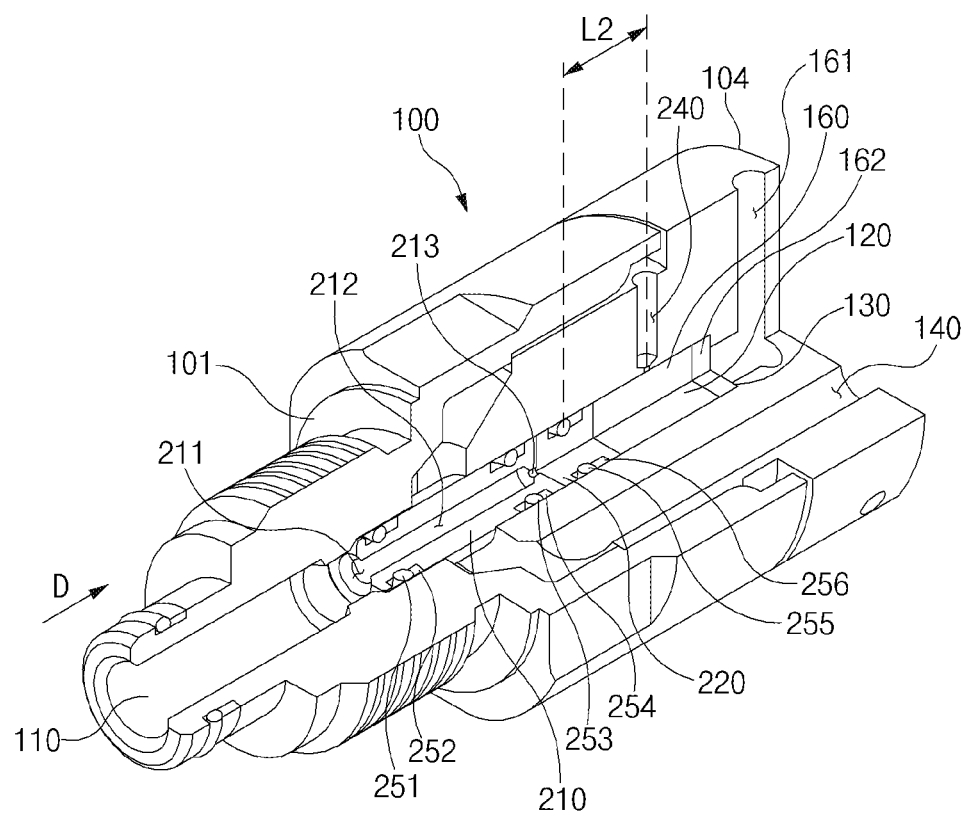
FIG. 5 is a partially cutaway perspective view illustrating a pressure relief device according to exemplary embodiment 2 of the present disclosure.

FIG. 5 is a partially cutaway perspective view illustrating a pressure relief device according to exemplary embodiment 2 of the present disclosure. Hereinafter, the pressure relief device according to exemplary embodiment 2 of the present disclosure will be described with reference to FIG. 5. The pressure relief device according to exemplary embodiment 2 differs from the pressure relief device according to exemplary embodiment 1 in terms of the blocking part. Components identical or corresponding to the components of the pressure relief device according to exemplary embodiment 1 are denoted by identical or corresponding reference numerals, and specific descriptions thereabout will be omitted.

A blocking part of this exemplary embodiment may include a first stem 210 and a second stem 220. The first stem 210 may be disposed in an interior passage 120 so as to be movable between a first position (refer to the position of the first stem 210 in FIG. 5) where the first stem 210 does not allow for release of high-pressure gas and a second position (refer to the position of the first stem 210 in FIG. 7) where the first stem 210 allows for release of the high-pressure gas. The second stem 220 may be disposed between the first stem 210 and a support part 160 and may be disposed in the interior passage 120 so as to be movable in a first direction D when the support part 160 is in the molten state.

Figure 6:
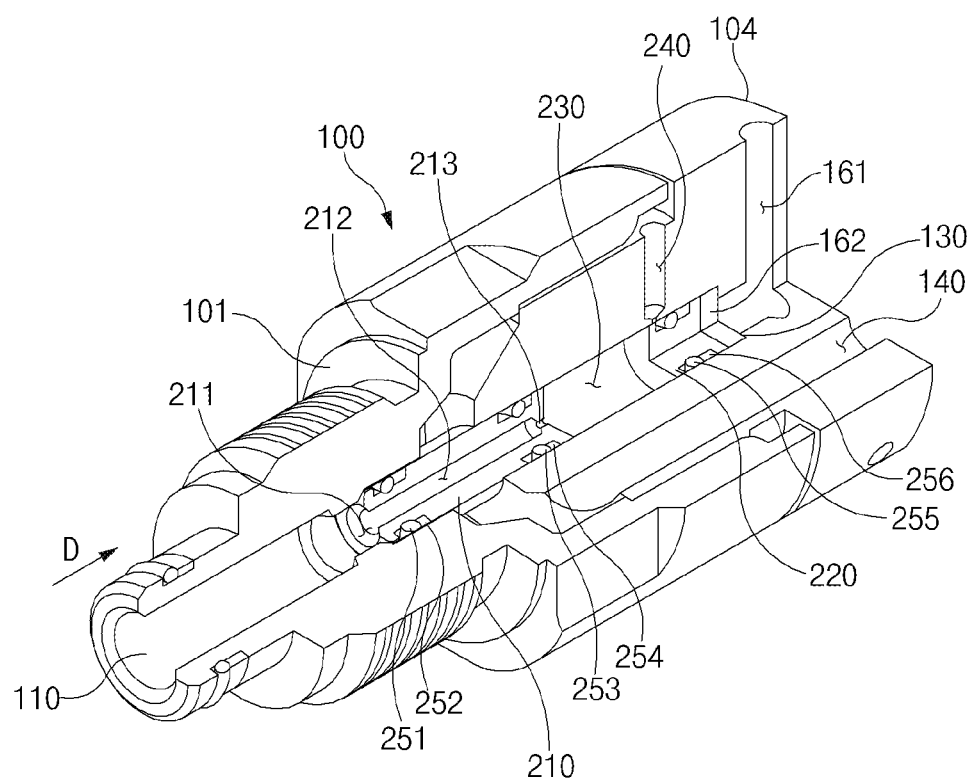
FIG. 6 is a partially cutaway perspective view illustrating an intermediate process between a blocking state and a connecting state of the pressure relief device of FIG. 5.
Figure 7:
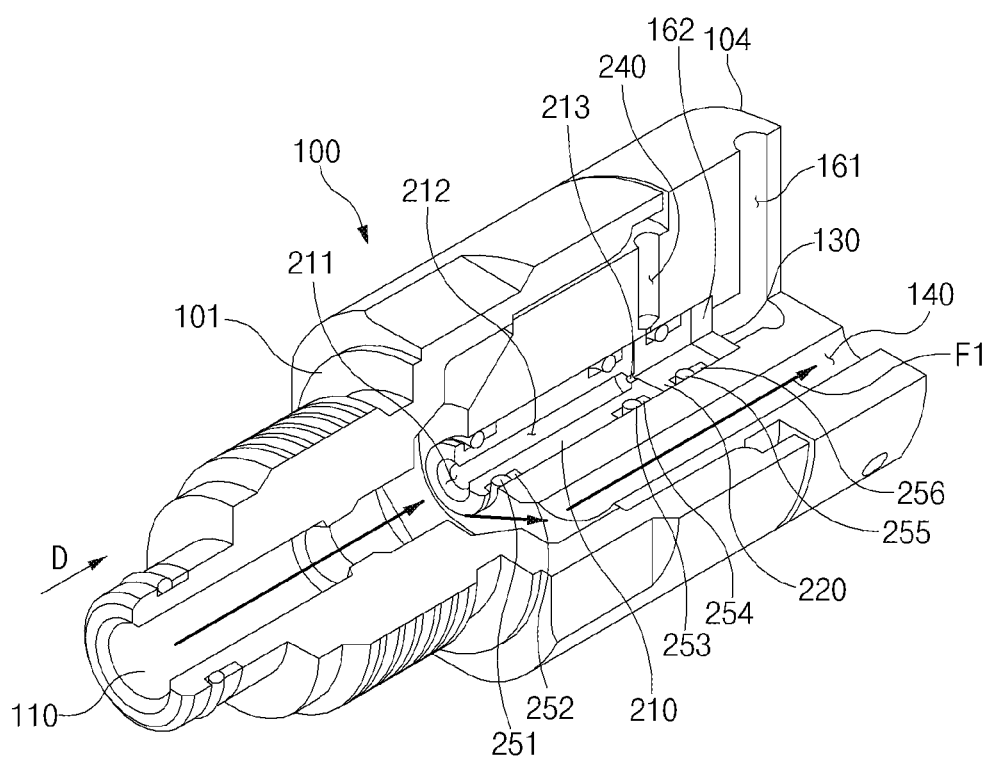
FIG. 7 is a partially cutaway perspective view illustrating the connecting state of the pressure relief device of FIG. 5.

For example, as illustrated in FIG. 5, the first stem 210 may be located in the first position by being supported by the second stem 220 while a movement of the second stem 220 is stopped by the support part 160 in a solid state. Further, as illustrated in FIGS. 5 and 6, the first stem 210 may move to the second position along the first direction D after the support part 160 is melted and the second stem 220 moves a second reference distance L2 or more in the first direction D. The blocking part is placed in a blocking state when the first stem 210 is located in the first position, and the blocking part is placed in a connecting state when the first stem 210 is located in the second position. For reference, FIG. 6 is a partially cutaway perspective view illustrating an intermediate process between the blocking state and the connecting state of the pressure relief device of FIG. 5, and FIG. 7 is a partially cutaway perspective view illustrating the connecting state of the pressure relief device of FIG. 5.

As illustrated in FIG. 5, the first stem 210 may have an inlet 211 connected with an inlet passage 110, an outlet 213 that is open toward the second stem 220, and a connecting passage 212 formed in the first stem 210 to connect the inlet 211 and the outlet 213. The second stem 220 may be moved in the first direction D by the high-pressure gas that is introduced through the connecting passage 212 and released toward the second stem 220 when the support part 160 is in the molten state.

The inlet 211 may have a larger area than the outlet 213. For example, the area of the inlet 211 may be more than 100 times larger than the area of the outlet 213. In this case, due to the difference in area between the inlet 211 and the outlet 213, the high-pressure gas passing through the connecting passage 212 of the first stem 210 may be released from the outlet 213 at a pressure higher than the pressure at the inlet 211 to push the second stem 220.

As illustrated in FIG. 6, the first stem 210 may be arranged such that a movement to the second position is stopped by the pressure that is formed in a space 230 when the high-pressure gas is supplied, through the connecting passage 212, into the space 230 that is formed between the first stem 210 and the second stem 220 by a movement of the second stem 220. For example, when the space 230 between the first stem 210 and the second stem 220 is filled with the high-pressure gas, the first stem 210 may be in a stop state due to an equilibrium between the pressure formed in the space 230 and the pressure of the high-pressure gas introduced through the inlet passage 110, and the second stem 220 may move while discharging the molten support part 160 from the interior passage 120.

A body 100 may further include an exhaust passage 240. As illustrated in FIG. 6, the exhaust passage 240 may be closed before the second stem 220 moves the second reference distance L2 or more in the first direction D and may connect the space 230 and the outside of the body 100 when the second stem 220 moves the second reference distance L2 or more in the first direction D. The high-pressure gas that fills the space 230 may not be released through a support part discharge passage 161 or the exhaust passage 240 by a third packing 255 that will be described below. However, when the third packing 255 passes by the exhaust passage 240 due to a movement of the second stem 220, the high-pressure gas in the space 230 may be released to the outside through the exhaust passage 240. The distance between the position of the third packing 255 when the second stem 220 is not moved due to the support part 160 in a solid state and the position of the exhaust passage 240 may be the second reference distance L2. When the high-pressure gas starts to be released through the exhaust passage 240, the pressure equilibrium is lost so that the first stem 210 may move in the first direction D. The exhaust passage 240 may have a larger diameter than the outlet 213 of the first stem 210. Accordingly, the amount of high-pressure gas released from the space 230 may be greater than the amount of high-pressure gas introduced into the space 230, and therefore pressure loss in the space 230 may be more smoothly generated.

As illustrated in FIG. 5, the blocking part may include first to third packing 251, 253, and 255 and first to third insertion grooves 252, 254, and 256 for receiving the first to third packing 251, 253, and 255. The packing 251, 253, and 255 are all provided to stop release of the high-pressure gas. For example, the second packing 253 prevents the high-pressure gas in the space 230 from flowing back to the inlet passage 110.

According to the present disclosure, the passage for discharge of the molten support part and the passage for release of the high-pressure gas are separated from each other, and the discharge of the molten support part and the release of the high-pressure gas are performed with a time difference. Accordingly, the temperature pressure relief device may reduce a risk of flow-rate reduction and passage closure due to re-solidification of the support part and may improve the high-pressure release stability of a vehicle or a fuel storage system that uses high-pressure gas.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A temperature pressure relief device comprising:
a body including an inlet passage into which gas is introduced, an interior passage extending from the inlet passage in a predetermined first direction, and a gas exhaust passage formed between the inlet passage and a reference end that is a distal end of the interior passage in the first direction, the gas exhaust passage being configured to connect the interior passage to an outside of the body;
a blocking part disposed in the interior passage of the body and selectively placed in one of a blocking state in which the interior passage and the gas exhaust passage are disconnected from each other so as not to allow for a release of the gas or a connecting state in which the interior passage and the gas exhaust passage are connected to each other to allow for the release of the gas; and
a support part arranged between the blocking part and the reference end, wherein the support part is maintained in a solid state at a reference temperature or less and is in a molten state at more than the reference temperature and discharged from the interior passage,
wherein the blocking part is placed in the blocking state by being supported by the support part when the support part is in the solid state, and the blocking part is placed in the connecting state after at least a portion of the support part is discharged from the interior passage when the support part is in the molten state,
wherein the blocking part includes:
a first stem disposed in the interior passage so as to be movable between a first position where the first stem does not allow for the release of the gas and a second position where the first stem allows for the release of the gas; and
a second stem arranged between the first stem and the support part and disposed in the interior passage so as to be movable in the first direction when the support part is in the molten state,
wherein the first stem has an inlet connected with the inlet passage, an outlet configured to be open toward the second stem, and a connecting passage formed in the first stem to connect the inlet to the outlet, and
wherein the second stem is moved in the first direction by the gas introduced through the connecting passage and released toward the second stem when the support part is in the molten state.

2. The temperature pressure relief device of claim 1, wherein a connecting point refers to a point on the interior passage that is located closest to the inlet passage among points at which the interior passage and the gas exhaust passage interconnect, and a blocking point refers to a point on the blocking part that is located closest to the inlet passage among points at which the interior passage and the gas exhaust passage are disconnected by the blocking part,
wherein, when the support part is in the solid state, the blocking part is supported by the support part, such that the blocking point is located closer to the inlet passage than the connecting point and that the blocking part is placed in the blocking state,
wherein, when the support part is in the molten state, the blocking part is moved in the first direction by a first reference distance or more by the gas introduced through the inlet passage, such that the blocking point is located farther away from the inlet passage than the connecting point and that the blocking part is placed in the connecting state, and
wherein the blocking state is maintained before the blocking part is moved in the first direction by the first reference distance or more.

3. The temperature pressure relief device of claim 1,
wherein the first stem is located in the first position by being supported by the second stem while a movement of the second stem is stopped by the support part in the solid state, and the first stem is moved to the second position along the first direction when the support part is in the molten state and the second stem is moved in the first direction by a second reference distance or more, and wherein the blocking part is placed in the blocking state when the first stem is located in the first position, and the blocking part is placed in the connecting state when the first stem is located in the second position.

4. The temperature pressure relief device of claim 3, wherein the inlet has a larger area than the outlet.

5. The temperature pressure relief device of claim 3, wherein the first stem is arranged such that a movement of the first stem to the second position is stopped by pressure formed in a space between the first stem and the second stem when the gas is supplied, through the connecting passage, into the space by a movement of the second stem.

6. The temperature pressure relief device of claim 5, wherein the body further includes an exhaust passage configured to be closed before the second stem is moved in the first direction by the second reference distance or more and to connect the space to the outside of the body when the second stem is moved in the first direction by the second reference distance or more.

7. The temperature pressure relief device of claim 1, wherein the blocking part includes packing coupled to an outer circumferential surface of the first stem so as to be brought into contact with an inner circumferential surface of the interior passage, and wherein a ring-shaped insertion groove is concavely formed on a surface of the first stem and the packing is disposed in the insertion groove.

8. The temperature pressure relief device of claim 1, wherein the body further includes a support part discharge passage configured to connect the interior passage and the outside of the body to discharge the support part in the molten state from the interior passage.

9. The temperature pressure relief device of claim 8, wherein the body further includes a support located between the support part and the reference end and configured to prevent extrusion of the support part due to pressure applied to the support part by the gas through the blocking part.

10. The temperature pressure relief device of claim 9, wherein the support has a mesh structure to allow the support part in the molten state to pass through the support.

11. The temperature pressure relief device of claim 1, wherein the body includes a housing having an interior space that is open at a distal end in the first direction and a plug arranged in the interior space through an opening of the housing to cover the opening, wherein the housing includes the inlet passage, wherein the plug includes the gas exhaust passage, and wherein a diameter of the inlet passage is smaller than an outer diameter of the blocking part such that a movement of the blocking part to the inlet passage is stopped.

* * * * *